May 7, 1935. K. J. TOBIN 2,000,306
HANGER FOR AUTOMOBILES
Filed Feb. 15, 1932 2 Sheets-Sheet 1
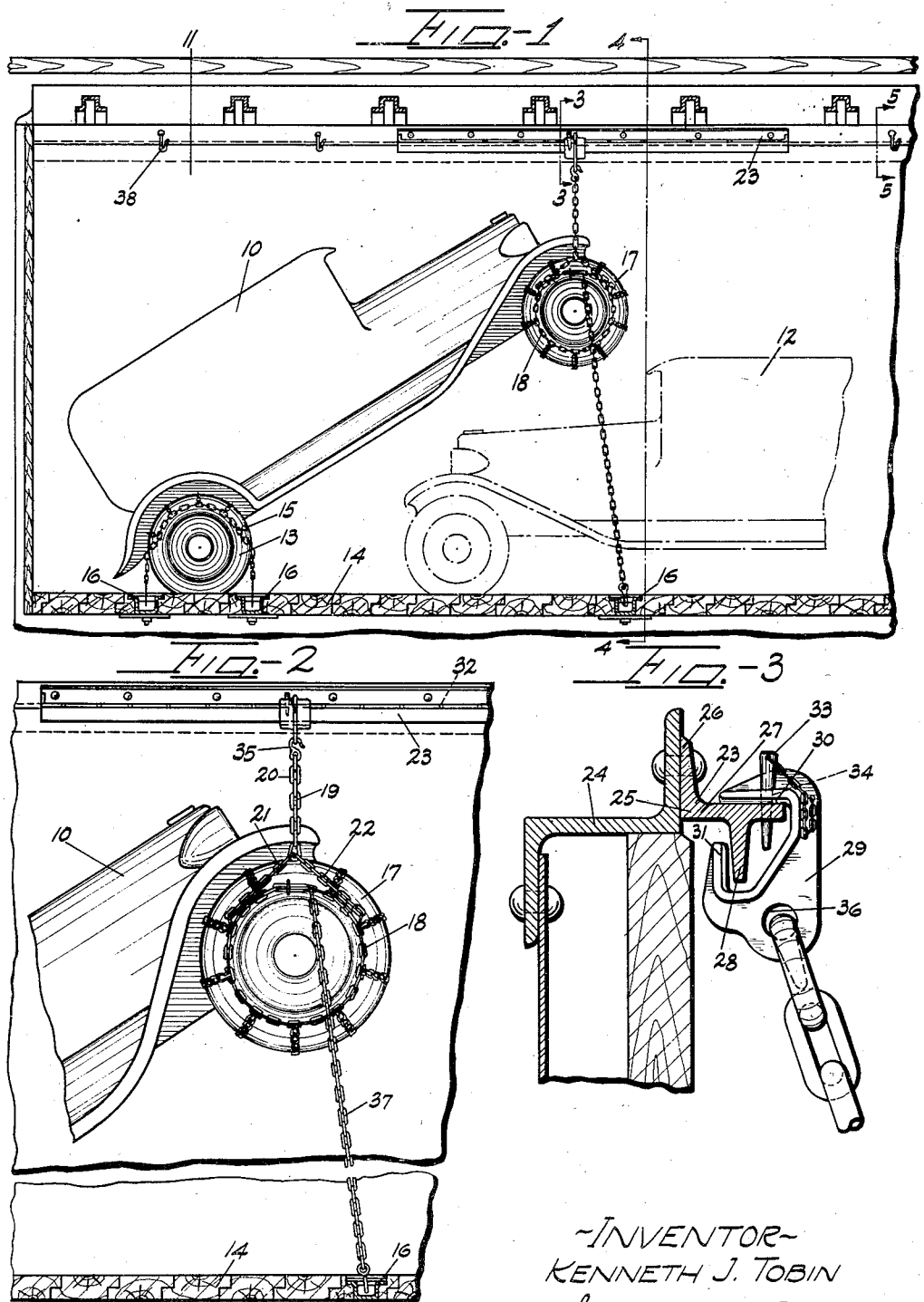
-INVENTOR-
KENNETH J. TOBIN
By Samuel Reese
ATTY.

May 7, 1935.　　　　K. J. TOBIN　　　　2,000,306
HANGER FOR AUTOMOBILES
Filed Feb. 15, 1932　　　　2 Sheets-Sheet 2
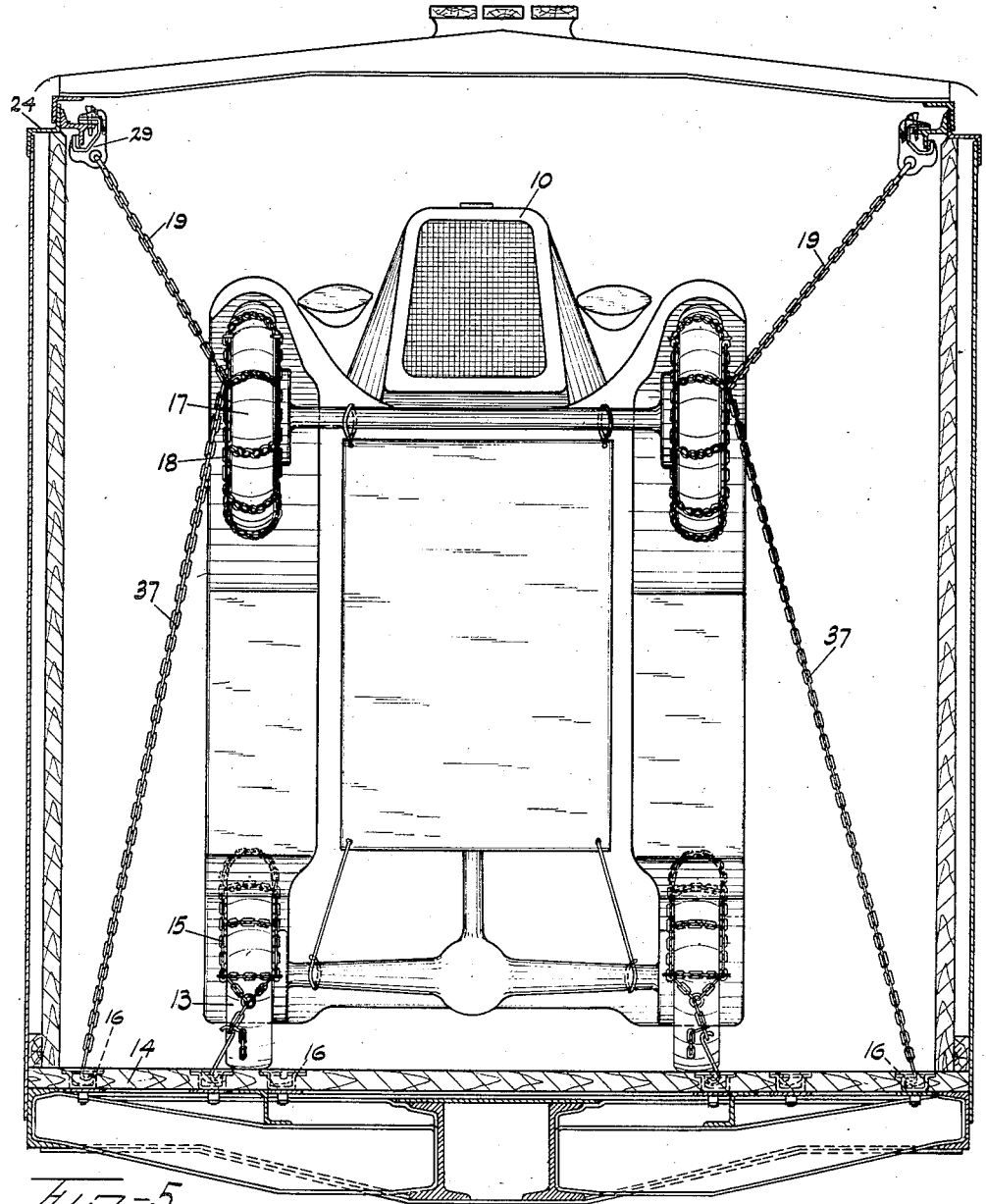
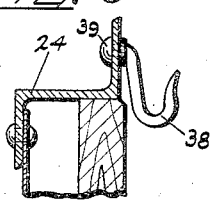
INVENTOR-
KENNETH J. TOBIN
By- Samuel Reese
ATTY.

Patented May 7, 1935

2,000,306

UNITED STATES PATENT OFFICE 2,000,306

HANGER FOR AUTOMOBILES

Kenneth J. Tobin, Chicago, Ill., assignor, by mesne assignments, to Evans Products Company, Detroit, Mich., a corporation of Delaware Application February 15, 1932, Serial No. 593,037

9 Claims. (Cl. 105—368)

This invention relates to hangers for automobiles adapted to suspend an automobile above the floor of a freight car in which said automobile is being transported.

It is an object of this invention to provide hangers for suspending automobiles in a freight car for shipment therein, which hangers may constitute a permanent part of the equipment of the car, are capable of ready application to automobiles and which are strong and adapted for repeated service.

A further object is to provide a hanger for suspending automobiles for shipment in freight cars, which hanger may be permanently applied to the car without affecting utility of the car for transportation of other commodities.

A further object is to provide hangers for suspending automobiles for shipment in a freight car, said hangers being so mounted in the car as to permit suspension of automobiles of varying lengths of wheel base.

A further object is to provide hangers for suspending automobiles for shipment in freight cars, said hangers being so mounted as to be capable of assuming a plurality of different positions lengthwise of the car.

A further object is to provide hangers which are formed of a plurality of jointed members.

A further object is to provide hangers in the form of slings for the reception of wheels of an automobile, said slings being adapted to be fastened to a freight car in which said automobile is being transported, above and below the automobile.

Other objects will appear as the description of the invention proceeds.

In the drawings forming a part of this specification

Figure 1 is a sectional view taken longitudinally within a freight car illustrating the invention applied to an automobile transported in inclined position and showing in dot and dash lines the approximate position of an adjacent automobile which is shipped flat.

Figure 2 is an enlarged fragmentary elevation of a portion of the inclined automobile to which a hanger embodying the invention is applied.

Figure 3 is a vertical section taken on line 3—3 of Figure 1, showing the manner of supporting the hanger from a position above the automobile to which the hanger is applied.

Figure 4 is a sectional view taken on line 4—4 of Figure 1.

Figure 5 is a sectional view taken on line 5—5 of Figure 1.

Referring, now, to the figures of the drawings which illustrate a preferred embodiment of the instant invention, there is shown an automobile 10 positioned in angular or inclined relation with respect to a railway freight car 11 in which said automobile is placed for transportation. The inclined or, as it is known in the art, the half-decked position of the automobile 10 is customarily given to automobiles shipped in freight cars so as to increase the number of such automobiles which may be transported in a single freight car. Because of the inclined position it will be apparent from a consideration of Figure 1 of the drawings that an automobile such as 12, which is shipped flat, that is with its four wheels in contact with the floor, may extend a substantial distance under the inclined automobile so as to conserve space within the freight car. The rear wheels 13 of the inclined automobile 10, which are illustrated as resting directly upon the floor 14, are secured to the floor by means of chains 15 embracing the wheels and having engagement with a plurality of brackets or anchoring devices 16 carried by the floor. The means for securing the rear wheels of the automobile in engagement with the floor form no particular part of the instant invention, this means forming the subject matter of a separate application. It is to be understood, however, that the wheels of the inclined automobile which rest upon the floor are secured by some means thereto.

In order to maintain one end of the inclined automobile in elevated position above the floor of the car the novel hanger of the invention is utilized. This hanger, which is applied to each of the wheels 17 of the automobile elevated above the floor, is adapted to suspend the elevated end of the automobile from the car and embodies a sling comprising a wheel receiving member 18, which may take the form of chains extending entirely around the periphery of the wheel, and a member 19, preferably in the form of a chain, having the three branches 20, 21 and 22. The branches 21 and 22 are secured to the wheel receiving member in any desired manner and converge therefrom into engagement with the branch 20 which in turn is supported from the freight car above the suspended end of the automobile from brackets 23 secured preferably to the side plates 24 of the car. The brackets 23, a plurality of which are utilized and positioned in spaced relation longitudinally of the car, are formed preferably of an angle bar 25, each of which comprises an attaching flange 26, a horizontal portion 27 and a depending flange 28 extending downwardly from the underside of the horizontal portion 27. A securing member 29 to which the branch 20 of the member 19 is attached is adapted to be retained by the angle member 25. For this purpose the securing member 29 is provided with a horizontal portion 30 adapted to overlie the horizontal portion 27 of the bracket 23 and with an upwardly extending flange 31 adapted to overlap the vertically depending flange 28 of the bracket member. By this relationship the securing member 29 is maintained by the bracket member 23 and is adapted to have movement upon said bracket member to assume various predetermined positions relative thereto. The horizontal portion 27 of the bracket member 23 which extends beyond the depending flange 28 is provided with a plurality of spaced openings 32 adapted to receive a securing pin 33 which extends through an opening 34 provided in the securing member 29 in order to fasten said securing member upon the bracket in the desired position. Attachment between the branch 20 of the member 19 and the securing member 29 is effected preferably by means of a hook 35 adapted to extend through an opening 36 provided in the securing member.

The members 19, as best illustrated in Figure 4 of the drawings, are directed inwardly and downwardly from their attachment to the car to the wheels at the suspended end of the automobile. This position of the members, it will be manifest, tends to prevent movement of the suspended end of the automobile transversely of the freight car. Means is provided, furthermore, which effectively prevents, through its engagement with the wheels 17, relative vertical movement of the suspended end of the automobile. This means in the present embodiment of the invention preferably takes the form of a chain 37 extending from each of the wheels 17 to the floor of the car where the chains 37 are adapted to be engaged with anchors 16 provided in said floor. It is to be noted that a plurality of anchors 16 are positioned in the floor of the freight car longitudinally of the car so that the chains 37 may readily be secured to the floor irrespective of the position or length of the inclined automobile. The chains 37 extend from their engagement with their respective anchors 16 upwardly and inwardly relative to the car to the point of engagement with the wheel receiving members 18 secured to the automobile wheels. It is to be observed that the attachment between the wheel receiving members 18 and the members 19 and the chains 37 occurs above the axis of rotation of the automobile wheels. By the position of this attachment of the parts above indicated it has been proved by actual test that tendency of turning of the wheels transversely of the automobile is effectively resisted.

While the character of the freight car 11 is such as to adapt it particularly for the transportation of automobiles it is essential that said freight car, in order to serve as a general utility car, should be adapted for the transportation of commodities other than automobiles. For the attainment of this end the freight car is provided with a plurality of spaced hooks 38 secured preferably to the side plate 24 of the car as indicated at 39. It will be apparent that when commodities other than automobiles are to be transported in the freight car the wheel receiving members 18, members 19 and the securing chains 37 may, by engagement with the hooks 38, be maintained adjacent the roof of the car so as not to interfere with the loading or transit of other commodities.

In the application of the hangers of the instant invention in order to suspend an automobile in elevated position above the floor of a freight car, said automobile is initially given the position within the freight car which it is to assume during transit. As illustrated in Figure 1 of the drawings the front end of the automobile will be elevated above the floor of the car. After such elevation the wheels at the elevated end of the automobile may then be deflated in order to more readily apply the wheel receiving members 18 thereto. Inasmuch as these wheel receiving members preferably extend around the entire periphery of the wheels 17 they may be so constructed as to serve as skid chains and, as such, constitute a part of the equipment of the automobile. The members 19 which are secured to the wheel receiving members in any desired manner are then hung from the brackets 23 and the chains 37, which are attached to the wheel receiving members 18, are engaged with the brackets or anchors 16 in the floor of the freight car. Upon inflation of the wheels 17 the wheel receiving members 18 will be rigidly maintained upon the wheels and the chains 37 will be drawn taut. If desired, however, adjusting devices may be embodied in the chains 37 in order to place such chains under tension in lieu of effecting this result by means of deflation and inflation of the wheels. When the automobile has been secured to the freight car, as clearly shown in Figure 1 of the drawings, it will be apparent that undue movement thereof in any direction is obviated.

By the term "wheel" used throughout the specification it is intended to include the tires customarily applied to automobile wheels.

It is apparent that numerous changes and modifications in the details of the invention will occur to those skilled in the art. It is intended, therefore, that all such changes and modifications are to be comprehended within this invention, which is to be limited only by the scope of the claims appended hereto.

I claim:

1. In combination, in a railway freight car, an automobile in said car and a sling engaging each wheel at one end of said automobile to secure said end in suspended position in said car, each of said slings comprising a member engaging the entire circumference of a wheel and a portion extending upwardly therefrom adapted to be secured to said car above said suspended end, means extending from said member adapted to be secured to said car above said suspended end, said portion and said means being fastened to said member above the axis of rotation of said wheel.

2. In combination, in a railway freight car, an automobile, and slings for securing one end of said automobile in suspended position in said car, each of said slings comprising a chain secured around each wheel at said end of the automobile, means for fastening each sling to said car above said suspended end and means for fastening each sling to the car below said end.

3. In combination, in a railway freight car, an automobile, and slings for securing one end of said automobile in suspended position in said car, each of said slings comprising a chain secured around each wheel at said end of the automobile, means for fastening each sling to said car above said suspended end and means for fastening each sling to the car below said end, said means including brackets secured to said car and members fastened to said slings and having engagement with said brackets.

4. In combination, in a railway freight car, an automobile, and slings for securing one end of said automobile in suspended position in said car, each of said slings comprising a chain secured around each wheel at said end of the automobile, means for fastening each sling to said car above said suspended end and means for fastening each sling to the car below said end, said means including brackets secured to said car and members fastened to said slings and having engagement with said brackets, said brackets being secured to said car above said suspended end of the automobile and to the floor of said car.

5. In combination, in a railway freight car, an automobile, and slings for securing one end of said automobile in suspended position in said car, each of said slings comprising a chain secured around each wheel at said end of the automobile, means for fastening said sling to said car above said suspended end and means for fastening said sling to the car below said end, said means including brackets secured to said car and members fastened to said slings and having engagement with said brackets, a plurality of said brackets being secured to said car above said suspended end of the automobile, said latter brackets forming tracks with which said members may have selective hooked engagement.

6. In combination, in a railway freight car, an automobile, and slings for securing one end of said automobile in suspended position in said car, each of said slings comprising a chain secured around each wheel at said end of the automobile, means for fastening each sling to said car above said suspended end and means for fastening each sling to the car below said end, said means including brackets secured to said car and members fastened to said slings and having engagement with said brackets, a plurality of said brackets being secured to said car above said suspended end of the automobile, said latter brackets forming tracks with which said members may have selective hooked engagement, and means for fastening said members at a plurality of predetermined points to said tracks.

7. In combination, in a railway freight car, an automobile in said car and a sling engaging each wheel at one end of said automobile to secure said end in suspended position in said car, each of said slings comprising a member engaging the entire circumference of a wheel and a portion extending upwardly therefrom adapted to be secured to said car above said suspended end, means extending from said member adapted to be secured to said car below said suspended end, said portion being fastened to said member above the axis of rotation of said wheel.

8. In combination, in a railway freight car, an automobile in said car and a sling engaging each wheel at one end of said automobile to secure said end in suspended position in said car, each of said slings comprising a member engaging the entire circumference of a wheel and a portion extending upwardly therefrom adapted to be secured to said car above said suspended end.

9. In combination, in a railway freight car, an automobile in said car and a sling engaging each wheel solely at one end of said automobile to secure said end in suspended position in said car, each of said slings comprising a flexible wheel receiving member adapted to receive a substantial portion of the circumference of said wheel and a portion secured to said member above the axis of rotation of said wheel extending upwardly therefrom and secured to said car above said suspended end.

KENNETH J. TOBIN.

CERTIFICATE OF CORRECTION.

Patent No. 2,000,306. May 7, 1935.

KENNETH J. TOBIN.

It is hereby certified that error appears in the printed specification of the above numbered patent requiring correction as follows: Page 2, second column, line 53, claim 1, for "above" read below; and that the said Letters Patent should be read with this correction therein that the same may conform to the record of the case in the Patent Office.

Signed and sealed this 25th day of June, A. D. 1935.

Bryan M. Battey (Seal) Acting Commissioner of Patents.